June 21, 1949.  J. OAKLEY  2,473,815
TOOL APPARATUS
Filed Dec. 13, 1945
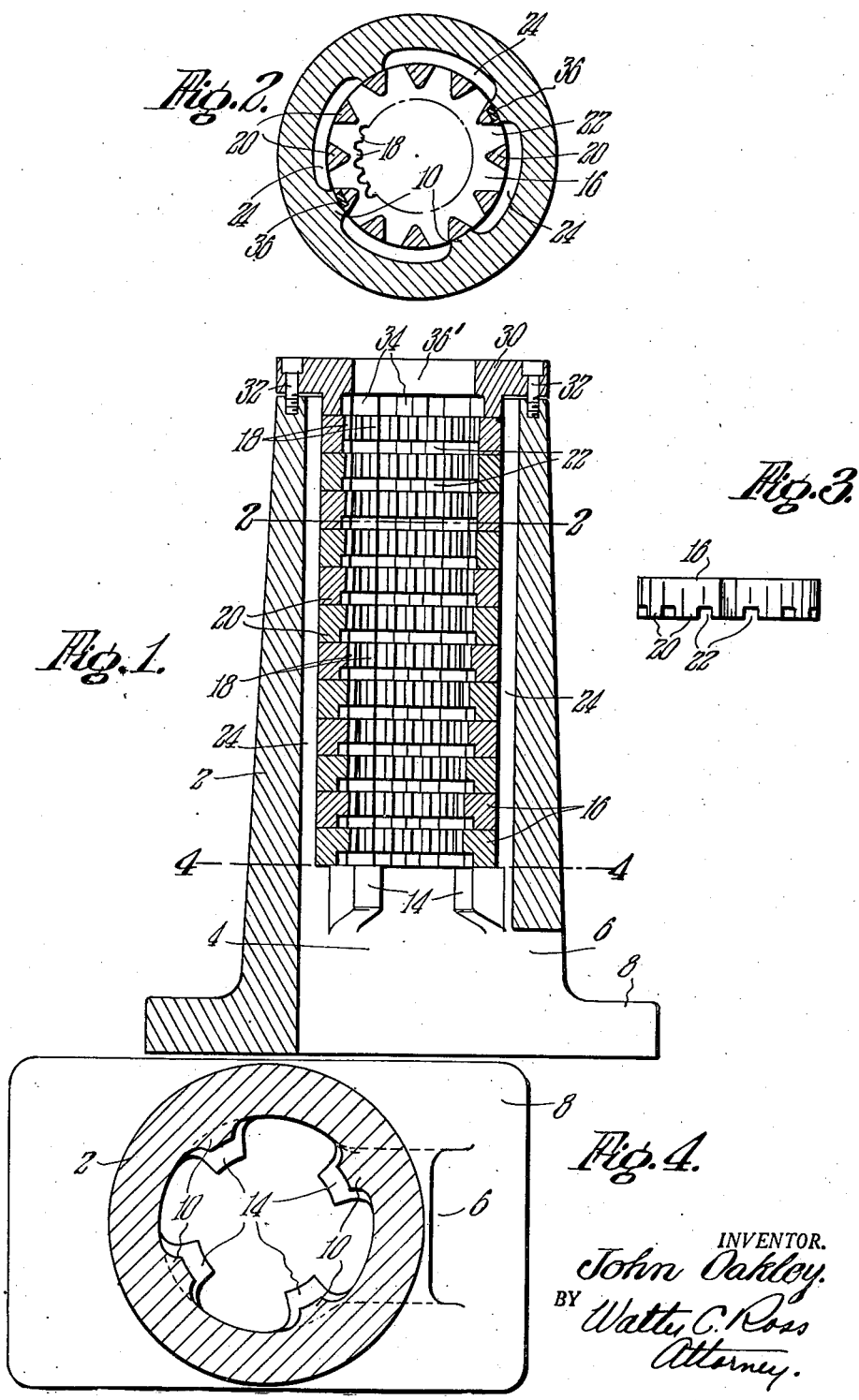
INVENTOR.
John Oakley.
BY Watts C. Ross
Attorney.

Patented June 21, 1949

2,473,815

UNITED STATES PATENT OFFICE 2,473,815

TOOL APPARATUS

John Oakley, Springfield, Mass., assignor to Perkins Machine and Gear Company, West Springfield, Mass., a corporation of Massachusetts Application December 13, 1945, Serial No. 634,737

2 Claims. (Cl. 29—95.1)

This invention relates to tool apparatus and is directed more particularly to tool apparatus for forming alternate slots and teeth on circular objects such as a gear blank.

The principal objects of the invention are directed to a tool construction which is characterized by a plurality of cutting members which are held together in stacked relation and have openings therethrough which are provided with peripherally spaced cutting teeth so that a gear blank may be passed therethrough for forming alternate peripheral spaces and teeth.

According to the invention, the cutting members have cutting teeth integral therewith so as to provide a strong rigid structure whereby to obtain accurate results while at the same time the cutting members are readily and easily assembled and disassembled to facilitate conditioning of said members.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a longitudinal sectional elevational view through a tool apparatus embodying the novel features of the invention;

Fig. 2 is a sectional plan view on the line 2—2 of Fig. 1;

Fig. 3 is a side elevational view of one of the cutter members of the invention; and Fig. 4 is a sectional plan view on the line 4—4 of Fig. 1.

Referring now to the drawings more in detail, the invention will be fully described.

A support or holder 2 is provided which has a longitudinal cylindrical bore 4 extending therethrough with an outlet 6 at the lower side thereof. There may be a flange 8 on the lower end of the holder if desired.

A plurality of ribs 10 extend inwardly of the wall of the bore of the holder and supporting means is provided in the lower portion of the bore which may include a plurality of abutments 14.

Cylindrical cutter members 16 are provided and inner adjacent faces of the ribs 10 are formed to receive the members 16 in such a manner as to hold said members in accurate alignment in the stacked relation shown.

The cutter members 16 each have a central opening therethrough which is provided with circumferentially spaced inwardly extending cutting teeth 18 having upper cutting edges on the upper sides thereof.

Each cutting member 16 is provided on its lower face with peripherally spaced downwardly extending bosses 20 which rest on the cutting member therebelow and provide passageways or outlets 22 therebetween which are in communication with vertical channels 24 formed by the peripheries of the cutting members and wall of the bore between the ribs 10.

A cap 30 is secured to the upper side of the holder by screws 32 or the like and it is provided with bosses 34 which bear on the uppermost cutter member 16.

Keys such as 36 fit in grooves provided in opposite sides of the cutter members and prevent relative rotation of the said members when in the stacked relation shown.

The cap 30 by means of the screws 32 or other means exerts pressure on the stacked cutter members while the keys 36 hold said members against rotation all to the end that a strong rigid structure is provided.

The cutting members having the openings therethrough provide an elongated opening through which a circular object may be passed, the entrance thereto being a hole 36' in the cap 30. The inwardly extending cutting teeth of the members 16 provide longitudinally spaced rows of cutting teeth arranged so that the teeth of the successive cutters project progressively inwardly relative to the entrance of the opening.

An object such as a gear blank is inserted in the opening 36' of the cap which is of a diameter to slidably receive and guide a member such as a gear blank to the cutting members.

The blank may be passed through the openings in the cutter members by pushing, pulling or by any suitable means and the apparatus may be operated in horizontal, vertical or any position desired.

The cutting teeth are arranged so that each cutting member removes a small amount of stock or takes a light cut so that the forming operation is fast without impairing accuracy.

As the blank passes through the cutters it emerges with peripheral alternate slots and teeth of the size and shape according to the cutting teeth. As the blank is passed through the cutters the stock removed therefrom or the chips formed in the operation pass outwardly through the passageways 22 into the channels 24.

In some cases it may be desired to provide openings in the wall of the holder for the passage of chips from the channels.

Altogether the apparatus provides an efficient means for quickly and economically forming teeth on a gear blank and the cutting teeth of the members 16 may take any form desired.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A broaching apparatus of the class described comprising in combination, a self supporting unitary holder having a longitudinal bore therethrough, supporting means in the lower end of said bore including a plurality of circumferentially spaced abutments extending inwardly from the bore, said bore of the holder provided longitudinally thereof and above said supporting means with circumferentially spaced inwardly extending projections the innermost sides of which are formed to cooperate and provide a circular axial guideway for cutter members and are arranged to space the sides of cutter members from the sides of said bore, a plurality of cutter members in stacked relation in said bore supported by said supporting means and held in axial alignment in said guideway by said projections whereby the sides of the cutters are spaced from the sides of the bore, a cap member secured to the upper end of the holder bearing on the uppermost cutter member and provided with an opening for the passage of a blank to said cutter members, said cutter members provided with means holding them against relative rotation in the guideway and having central axial and aligned openings therethrough which are provided with inwardly extending cutting teeth arranged whereby the teeth of successive cutters extend progressively inwardly from the uppermost to lowermost cutter members, the spaces between the projections and the abutments in conjunction with the sides of the bore and the sides of the cutters providing plural circumferentially spaced passageways longitudinally extending at the sides of the cutter members for the clearance of chips.

2. A broaching apparatus of the class described comprising in combination, a self supporting unitary holder having a longitudinal bore therethrough, supporting means in the lower end of said bore including a plurality of circumferentially spaced abutments extending inwardly from the bore, said bore of the holder provided longitudinally thereof and above said supporting means with circumferentially spaced inwardly extending projections the innermost sides of which are formed to cooperate and provide a circular axial guideway for cutter members and are arranged to space the sides of cutter members from the sides of said bore, a plurality of cutter members in stacked relation in said bore supported by said supporting means and held in axial alignment in said guideway by said projections whereby the sides of the cutters are spaced from the sides of the bore, a cap member secured to the upper end of the holder bearing on the uppermost cutter member and provided with an opening for the passage of a blank to said cutter members, said cutter members provided with means holding them against relative rotation in the guideway and having central axial and aligned openings therethrough which are provided with inwardly extending cutting teeth arranged whereby the teeth of successive cutters extend progressively inwardly from the uppermost to lowermost cutter members, the space between the projections and the abutments in conjunction with the sides of the bore and the sides of the cutters providing plural circumferentially spaced passageways longitudinally extending at the sides of the cutter members for the clearance of chips, the sides of said cutter members adjacent the sides of adjacent cutter members provided with circumferentially spaced radially extending grooves across said sides providing radial passageways in communication with the openings in said cutters and said first mentioned longitudinal passageways.

JOHN OAKLEY.

REFERENCES CITED

The following references are of record in the file of this patent:

UNITED STATES PATENTS

| Number | Name | Date |
| --- | --- | --- |
| 772,841 | Smith | Oct. 18, 1904 |

FOREIGN PATENTS

| Number | Country | Date |
| --- | --- | --- |
| 408,992 | Great Britain | Apr. 23, 1934 |